Oct. 3, 1933.  H. LIVA  1,929,362
LOCKABLE VALVE FOR GAS BURNERS
Filed July 23, 1932  2 Sheets-Sheet 1

WITNESSES
Edw. Thorpe
A. L. Kitchin

INVENTOR
Henry Liva
BY Munn & Co.
ATTORNEY

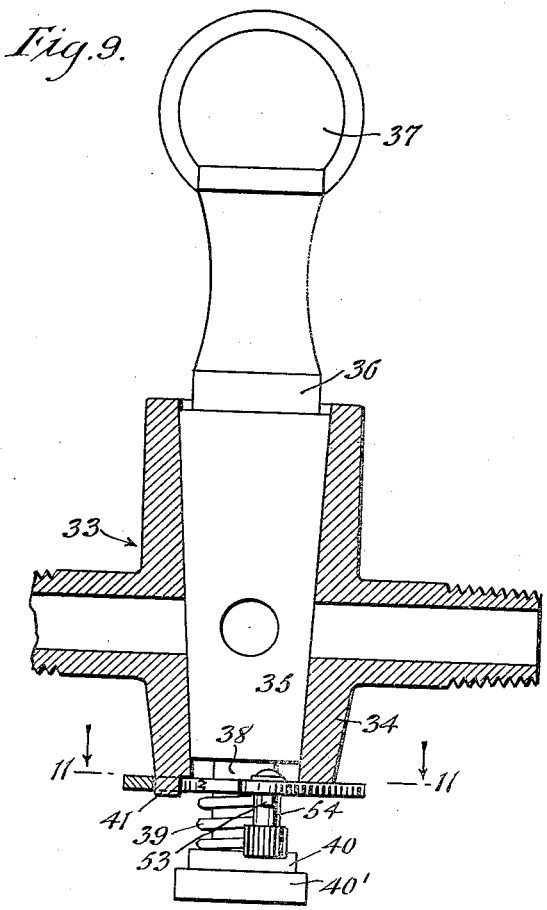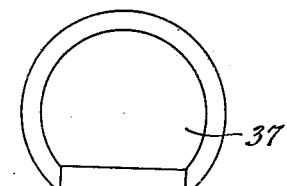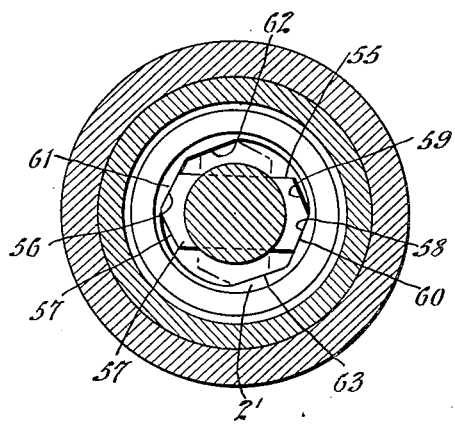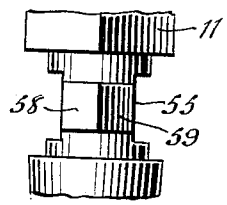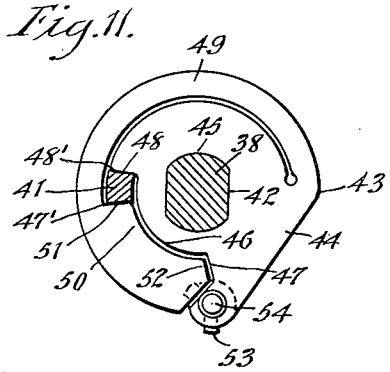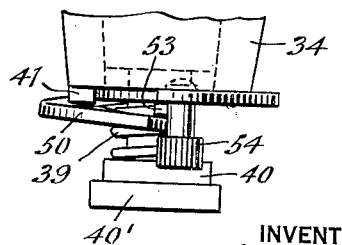

UNITED STATES PATENT OFFICE 1,929,362

LOCKABLE VALVE FOR GAS BURNERS

Henry Liva, Scranton, Pa., assignor of one-half to Angelo Sebastianelli, Scranton, Pa.

Application July 23, 1932. Serial No. 624,286

7 Claims. (Cl. 251—163)

This invention relates to lockable valves for gas burners and has for an object to provide an improved construction wherein valves for gas burners may be readily locked or unlocked and when locked held against accidental displacement though not against forcible displacement.

Another object of the invention is to provide a safety construction applicable to gas burner valves wherein the same when set in one position will permit the valve to swing back and forth freely as in the usual way and when set in another position will resist any movement of the valve, thus preventing accidental opening of the valve by children or careless persons.

A further object is to provide a construction which acts as a safety device and is rugged, durable and pleasing in appearance on the stove while at all times it is easy to clean.

In the accompanying drawings,—

Figure 7 is a sectional view through Figure 6 on line 7—7.

Figure 8 is a fragmentary side view of the valve's key in Figure 6.

Figure 9 shows one of the usual form of valves now on the market to which there is applied a modified form of lock.

Figure 10 is a view showing the lock shown in Figure 9 while being neutralized.

Figure 11 is a sectional view through Figure 9 on line 11—11.

Figure 1:
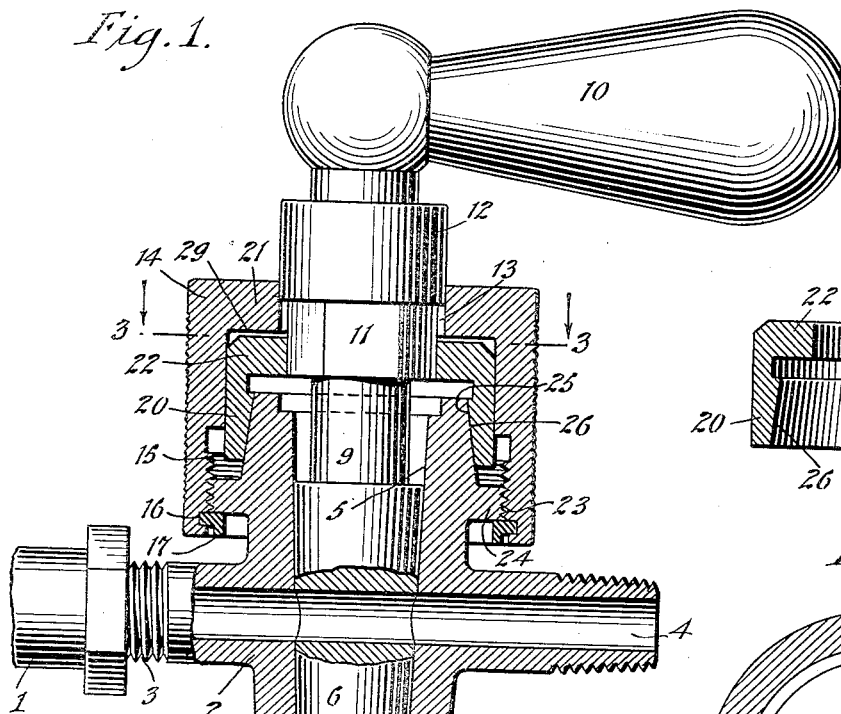
Figure 1 is a view principally in vertical section illustrating a gas burner valve with an embodiment of the invention applied thereto.
Figure 2:
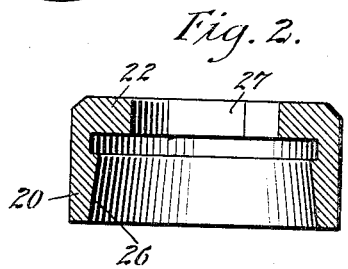
Figure 2 is a vertical sectional view through a valve cone disclosing certain features of the invention.
Figure 3:
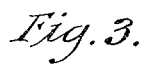
Figure 3 is a sectional view through Figure 1 on line 3—3.
Figure 3:
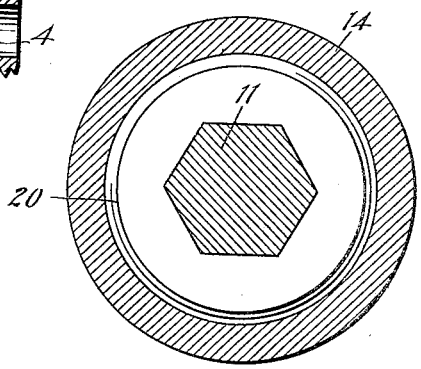
Figure 5:
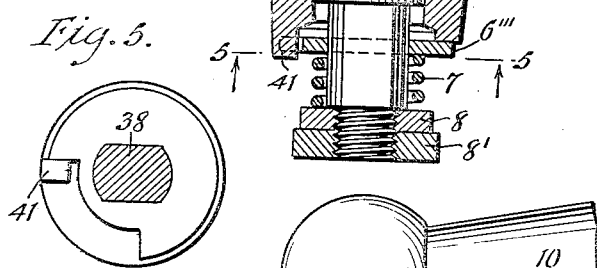
Figure 5 is a bottom view of the valve with the key section on line 5—5 in Figure 1 showing one of the usual constructions now on the market intended to retain the valve's key and to limit its rotation.
Figure 4:
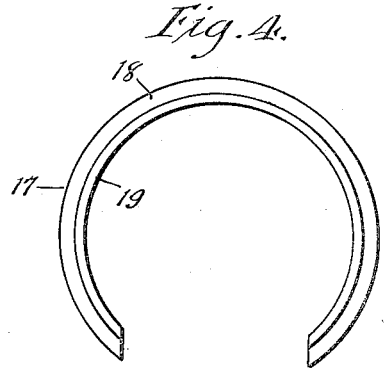
Figure 4 is a bottom plan view of the split retaining ring shown in Figure 1.

Referring to the accompanying drawings by numerals member 1 indicates a usual means to supply gas to any suitable form of burner, which means is connected to the valve casing 2 in the usual way, as, for instance, by being threaded thereon at 3. The casing 2 is provided with an inlet 4 screwed on to any suitable form of gas supply pipe. The casing 2 is provided with the usual key socket 5 accommodating the usual key 6 held in proper place by spring 7, nut 8, lock nut 8', washer 6''' and abutment 41. The parts that have been just described are old and well known and form no part of the present invention except in combination.

The key 6 is provided with a shaft or shank 9 to which a handle 10 is secured. However, the shank 9 is provided with an enlarged hexagonal member 11 and a circular member 12, member 12 extending into the bore 13 of a manually actuated sleeve 14, which sleeve is threaded at 15 and is provided with a groove 16 for receiving the split retaining ring 17. The ring 17 has a laterally extending flange 18 and a depending flange 19. The flange 19 is provided so that the ring may be readily grasped by the fingers of a person or by an instrument and contracted or constricted so that it may be inserted or removed from the groove 16. When this ring is in the position shown in Figure 1, it limits the upward movement of the sleeve 14, as shown in Figure 1, but does not affect the downward movement of the sleeve.

When the parts are positioned as shown in Figure 1 the cone sleeve 20 is loose, and, consequently, will freely turn as the shank 9 turns. It will be noted that the sleeve 14 has an annular over-hanging shoulder 21 which bears on the upper surface 22 of the cone sleeve 20, whereby when the sleeve 14 is rotated so as to be screwed downwardly, threads 15 act against the threads 23 on the enlargement 24 of the casing 2. Casing 2 is also provided with a beveled upper portion forming a cone 25 which coacts with the cone surface 26. When the sleeve 14 is screwed downwardly to the opposite position to that shown in Figure 1, the cone surface 26 is pressed tightly against the cone 25. and, consequently, when the handle 10 is turned the friction between the cone 25 and surface 26 will be such as to resist greatly the turning movement of the handle 10 and key 6. It will be noted that the cone sleeve 20 is provided with a hexagon-shaped opening 27 which fits rather closely the hexagon enlargement 11. It will be noted that if the sleeve 14 is screwed down somewhat, the valve is locked against accidental rotation, but, if desired, the handle 10 and key 6 could be rotated. The tighter cone 25 and surface 26 are pressed together, the greater the effort required in turning the valve. It will be observed that the valve in most parts consists of the usual valve now on the market including not only the key 6 but the abutment 41 and washer 6''', whereby this abutment cooperating with this washer, limits the movement to a full opening and full closing in the usual manner.

Valves used on gas burners should operate rather freely and yet if the parts are adjusted in this manner, small children or careless persons may open the valves when not desired. To prevent this action, the parts as shown in Figure 1 have been designed whereby they may be moved to a position which will be in a certain sense inoperative, or moved to a position where they will function to resist or prevent the rotation of the key 6. When the parts are in their locked position and the handle 10 is forced so as to open the valve, this action is not against the key 6, which has had no additional friction brought to bear thereon, as all the friction is on the surfaces 25 and 26. Ordinarily, the sleeve 14 is unscrewed as far as possible whereupon the ring 17 will strike against the enlargement 24. The valve may then be opened and closed freely. When the valve is closed, the sleeve 14 is given a partial rotation and immediately the cam surfaces, as above described, will begin to function. Ordinarily, these surfaces are brought together so as to have a medium amount of friction but, if desired, the sleeve 14 could be screwed down very tight and the parts would be substantially rigidly locked together without any extra pressure being brought to bear on the key 6, and, consequently, this key and its seat would not be in any way injured or worn.

Figure 6:
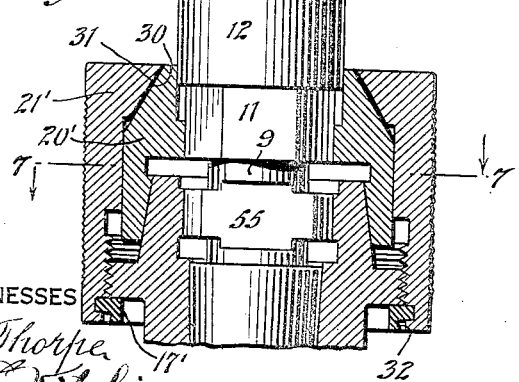
Figure 6 is a view similar to Figure 1 but showing a modified construction.

In Figure 6, a modified structure is shown to which reference is now made. The same numerals will be used in this figure as in Figure 1 except on modified structures. From an examination of this figure, it will be seen that a cone sleeve 20', in addition to the surface 26, is provided with a cone surface 30 coacting with the cam surface 31 formed on the flange or abutment 21'. In this form of the invention a ring 17' is provided with an inwardly extending portion or dove-tail structure 32 which permits easy grasping of this flange when the ring is applied or removed. This valve and safety device function in the same manner as the structure in Figure 1 except that there is greater friction surface to be used, and, therefore, a greater retarding action. This greater retarding action is secured by the friction cones 30 and 31 which act to retard or lock the parts in addition to acting to force the cone sleeve against the cone 25.

As shown clearly in Figures 6, 7 and 8, the shank 9 is provided with an enlargement 55 which is provided with faces 56, 57, 58 and 59, as shown in Figure 7. It will be noted that the full opening of the key 6 is limited by the faces 60 and 61 by reason of the enlargements 55 resting against these faces as shown in Figure 7. The full closing of the valve is limited to a 90° rotation by faces 57 and 59 resting against faces 62 and 63 of the valve casing 2 as shown in Figure 7. It will be understood that valve casing 2 is provided with enlargement 2' having certain faces as clearly illustrated in Figure 7 which coact with the various faces of the enlargement 55 to secure this result. It will be noted that the enlargement 55 is such that the member 20' may be readily fitted into place without interference so that when the parts are all assembled as shown in Figure 6 all the parts may function as described.

In Figures 9 to 10 inclusive a modified form of the invention is shown which is connected to a valve 33 of the usual kind now on the market, the same having a casing 34, a key 35, shank 36 and handle 37. A reduced extension 38 projects below the casing 34 and carries a spring 39, a nut 40, and a lock nut 40'. The casing 34 is provided with a lug or projection 41, while the reduced portion 38 has one or more squared or flattened sides 42 for receiving the locking member 43. The locking member 43 is provided with a central enlargement 44 having an aperture 45 of the same shape as the cross sectional member 38, so that when it is slid thereon, it will rotate therewith. The enlargement 44 is provided with a cutaway portion 46 whereby shoulders 47 and 48 are provided. A resilient extension 49 projects from enlargement 44, preferably, diametrically opposite the cutaway portion 46, and extends around the same so that the enlargement 50 may fit into the cutaway portion 46 and the shoulder 51 to engage the lug or stop 41, while the end 52 may strike the shoulder 47.

When the parts are in the position as shown in Figure 11, the key 35 is locked against movement and when it is desired to rotate the key to open the valve, the enlarged portion 50 is depressed or swung downwardly, as indicated in Figure 10, and then the key 35 moved to an open position, the usual projection 41 limiting the opening movement to a full open position by shoulder 47 resting against face 47'. When the parts are in a full open position, the locking member will be in the position shown in Figure 10 with the enlargement 50 resting on the abutment or projection 41, while the shoulder 47 will be pressing against this abutment. The parts remain in this position as long as the valve is fully open. If the valve should be half opened or closed, the enlargement 50 will slide along on top of the abutment 41, but when the valve is completely closed, the parts will move until the shoulder 51 has passed the abutment 41, and, consequently, the resilient action of member 49 will cause the same to snap into the position shown in Figure 11, whereupon the valve is locked closed, shoulder 48 resting against face 48'. Member 54 is rotatively riveted on locking member 43. It will be seen that this form of automatic valve lock can be neutralized to leave the valve free of being used in the usual way by depressing portion 50 a little beyond projection 53 and thereafter by turning member 54 to bring projection 53 from the position shown at 53 in Figure 11 to the position in dotted lines in the same figure so as to engage said portion 50 under projection 50 as shown in Figure 10. In this form of the invention the valve cannot be opened without releasing the locking member or breaking some part. In the form shown in Figures 1 and 6, the valve may be opened by forcing the same as the valve is held locked closed only through the action of friction.

I claim:—

1. A lockable valve for gas burners comprising a valve structure having a casing with a passageway therethrough and a key having a passageway therethrough, a handle for rocking said key back and forth to open and close the valve, means carried by the upper part of the casing presenting a friction cone, a cone sleeve coacting with said friction cone, means for clamping the cone sleeve against said friction cone, and means for connecting the cone sleeve with said key so that the cone sleeve will rotate with the key whereby when said cone sleeve is engaging said friction cone tightly said key will be substantially locked against rotation.

2. A valve for gas burners and a safety device for the valve, said valve including a casing having a port therethrough, a key having a port therethrough rotatably mounted in the casing, a shank extending from said key, said shank provided with a many sided enlargement, a handle for rotating said shank and key, said casing having an annular radiating web having threads on the periphery, said casing having also a friction cone at one end, a cone sleeve coacting with said friction cone, said cone sleeve having an opening of substantially the same shape as said many sided enlargement with the many sided enlargement fitting into said opening so as to slide upwardly and downwardly into it, and a sleeve threaded on to said flange, said sleeve having an over-hanging shoulder engaging said cone sleeve for moving the same so that the cone sleeve will engage with more or less friction said friction cone whereby said key is substantially locked against movement.

3. A safety valve for gas burners including a casing having a passageway extending therethrough and a key seat, a key fitted into said seat, said key having a passageway extending therethrough, a shank extending through said key, said shank being provided with an enlargement having a flattened side, said casing at the upper end being beveled presenting a friction cone, a cone sleeve fitting over said friction cone, said cone sleeve having an opening for accommodating said enlargement, said opening being of the same shape as the enlargement whereby when said shank is rotated said cone sleeve will be rotated, and means for pressing said cone sleeve against said friction cone on said casing for resisting the rotation of said key.

4. A safety gas valve including a casing having a friction cone at the upper part and a key provided with a shank, a hexagonal enlargement carried by said shank, a cone sleeve having an opening fitting said hexagonal enlargement and a cone surface fitting said friction cone, a sleeve threaded on to said casing provided with an overhanging shoulder positioned to engage and move said cone sleeve against said friction cone to produce a friction whereby said key cannot readily be rotated.

5. A gas valve including a casing having a friction cone portion at the upper end and an annular flange with a threaded periphery and a key fitting into the casing controlling the flow of gas therethrough, a shank extending from said key, said shank being provided with an enlargement having a flattened surface, a cone sleeve having an aperture fitting said enlargement, said cone sleeve being positioned to engage said friction cone, a sleeve having a threaded portion screwed on to said threaded flange, a resilient ring removably fitting into the lower part of said sleeve for limiting the movement thereof in one direction, said sleeve having an overhanging shoulder adapted to engage and move said cone sleeve against said friction cone when the sleeve is rotated in one direction whereby said key is substantially locked against rotation without any pressure being exerted on it.

6. A safety gas valve including a casing and a key, a shank extending from said key having an enlargement provided with a flat side, said casing having a friction cone at the upper end, a cone sleeve having an opening fitting said enlargement, said cone sleeve having a cone surface at one end internally thereof positioned to fit on said friction cone and a cone surface externally thereof at the opposite end, and a clamping sleeve provided with a shoulder having a cone surface fittting on the cone surface of said opposite end whereby when said sleeve acts on said cone sleeve friction will be provided at two spaced points for resisting the rotation of the cone sleeve and also resisting the rotation of said key.

7. A safety valve for gas burners including a valve structure, a key having a shank extending therefrom and provided with a pair of cone members, one of which is independent of the shank, the other being splined to said shank, the independent cone member being stationary, the other being rotatable with the key by virtue of the splining connection, and a clamping sleeve positioned to force said cone members together for producing a friction therebetween, whereby the rotation of said key is resisted.

HENRY LIVA.